(12) United States Patent
Bruck et al.

(10) Patent No.: US 7,775,594 B2
(45) Date of Patent: Aug. 17, 2010

(54) POWER SEAT ASSEMBLY WITH MOTOR ACTUATED SPRING RELEASE AND REWIND OF A SEATBACK SECTOR AND WITH THE MOTOR REMOVED FROM AN INERTIAL LOAD PATH SUCH AS DURING AN IMPACT EVENT

(75) Inventors: Stephen Bruck, Howell, MI (US); Tavis Lutzka, Davisberg, MI (US)

(73) Assignee: BAE Industries, Inc., Warren, MI (US)

( * ) Notice: Subject to any disclaimer, the term of this patent is extended or adjusted under 35 U.S.C. 154(b) by 0 days.

(21) Appl. No.: 12/184,616

(22) Filed: Aug. 1, 2008

(65) Prior Publication Data
US 2010/0026073 A1 Feb. 4, 2010

(51) Int. Cl.
*B60N 2/20* (2006.01)
(52) U.S. Cl. .............. 297/362; 297/362.11; 297/378.12
(58) Field of Classification Search .................. 297/362, 297/362.11, 378.12
See application file for complete search history.

(56) References Cited

U.S. PATENT DOCUMENTS

| | | | | |
|---|---|---|---|---|
| 3,343,872 A | * | 9/1967 | Reinmoller et al. | 297/362 |
| 3,356,415 A | * | 12/1967 | Putsch | 297/378.12 |
| 4,294,488 A | * | 10/1981 | Pickles | 297/367 R |
| 4,437,703 A | * | 3/1984 | Nishikori et al. | 297/362 |
| 4,521,055 A | * | 6/1985 | Fudala | 297/362 |
| 4,573,738 A | * | 3/1986 | Heesch | 297/362 |
| 4,657,125 A | * | 4/1987 | Heesch | 192/41 S |
| 4,685,736 A | * | 8/1987 | Tanaka et al. | 297/366 |
| 4,687,252 A | * | 8/1987 | Bell et al. | 297/362 X |
| 4,696,515 A | * | 9/1987 | Heesch | 297/374 |
| 4,720,144 A | * | 1/1988 | Heesch | 297/362 |
| 4,733,912 A | * | 3/1988 | Secord | 297/378.11 X |
| 4,781,415 A | * | 11/1988 | Heesch et al. | 297/362 |

(Continued)

FOREIGN PATENT DOCUMENTS

JP 05309026 A * 11/1993 ............ 297/362.11

*Primary Examiner*—Rodney B White
(74) *Attorney, Agent, or Firm*—Gifford, Krass, Sprinkle, Anderson & Citkowski, P.C.

(57) ABSTRACT

A power seat assembly with motor actuated release and rewind of a seatback sector. First and second support plates sandwich a forwardly biased seatback sector and a cam engaged with the seatback sector in an upright position. A first pin extends from said cam offset its pivotal connection and passes through a slot defined in the second support plate to define a range of pivotal motion of the cam. A toothed gear sector rotatably mounted to an exterior of the second support plates and exhibits a polygonal shaped portion as well as an end shoulder offset and inwardly recessed from exteriorly defined teeth and the polygonal shaped portion. An electric motor includes an output gear in toothed engagement with the gear sector and for rotating the gear sector in a first direction so that the polygonal shaped portion contacts and deflects the pin and cam out of contact with the seatback, causing it to rotate to a forward dump position. A second pin extends from the seatback sector and contacts the end shoulder at the dump position, the motor rotating the gear sector in a second direction and forcibly rewinding the seatback sector, against its bias, to the upright design position coinciding with the cam re-engaging the seatback sector.

18 Claims, 4 Drawing Sheets

U.S. PATENT DOCUMENTS

| | | | |
|---|---|---|---|
| 4,795,213 A * | 1/1989 | Bell | 297/367 R |
| 4,986,514 A * | 1/1991 | Ikegaya et al. | 297/362 |
| 5,150,632 A * | 9/1992 | Hein | 297/366 X |
| 5,156,439 A * | 10/1992 | Idlani et al. | 297/367 R |
| 5,205,609 A * | 4/1993 | Notta et al. | 297/362 X |
| 5,248,184 A * | 9/1993 | Morris | 297/362 X |
| 5,419,219 A | 5/1995 | Takizawa et al. | |
| 5,435,624 A | 7/1995 | Bray et al. | |
| 5,558,403 A * | 9/1996 | Hammoud et al. | 297/378.12 |
| 5,590,932 A * | 1/1997 | Olivieri | 297/367 R |
| 5,813,725 A * | 9/1998 | Robinson | 297/362 X |
| 6,193,316 B1 * | 2/2001 | Janke et al. | 297/362.11 |
| 6,428,104 B1 * | 8/2002 | Sakamoto et al. | 297/362.11 |
| 6,659,558 B2 * | 12/2003 | Sugimoto | 297/367 R |
| 6,712,430 B2 * | 3/2004 | Ito et al. | 297/362 |
| 6,733,076 B2 * | 5/2004 | Grable et al. | 297/362 |
| 7,066,543 B2 * | 6/2006 | Yu | 297/362 X |
| 7,118,178 B2 | 10/2006 | Daniels et al. | |
| 7,152,922 B2 | 12/2006 | Garland | |
| 7,243,996 B2 | 7/2007 | Daniels et al. | |
| 7,294,081 B2 | 11/2007 | Schuler et al. | |
| 7,461,899 B2 * | 12/2008 | Seibold | 297/362 X |
| 7,500,719 B2 * | 3/2009 | Kojima | 297/362.11 X |
| 7,661,760 B2 * | 2/2010 | Nakaya et al. | 297/362.11 X |
| 2002/0089223 A1 | 7/2002 | Yu | |
| 2006/0061183 A1 * | 3/2006 | White et al. | 297/378.12 |
| 2006/0250014 A1 | 11/2006 | Daniels | |
| 2006/0273645 A1 | 12/2006 | Ferrari et al. | |
| 2007/0063567 A1 | 3/2007 | Nakaya et al. | |
| 2007/0126272 A1 | 6/2007 | Deptolla | |
| 2009/0079248 A1 * | 3/2009 | Keyser et al. | 297/362.11 |

* cited by examiner

POWER SEAT ASSEMBLY WITH MOTOR ACTUATED SPRING RELEASE AND REWIND OF A SEATBACK SECTOR AND WITH THE MOTOR REMOVED FROM AN INERTIAL LOAD PATH SUCH AS DURING AN IMPACT EVENT

FIELD OF THE INVENTION

The present invention discloses a new powered release/ rewinding mechanism for incorporating into a modularized seat. More specifically, the powered assembly is capable of being incorporated into any row vehicle seats having cabling, mechanical latch and main clock springs for normal dump motion of the seatback relative to a seat bottom, the motor selectively functioning in a first procedure for trigger spring induced seatback dump and in a second procedure, to rewind the seatback to the upright design position.

BACKGROUND OF THE INVENTION

The present invention is well documented with examples of power seats for use in vehicle applications. The seats typically employ one or more electric motors having an output gear for power rotating the seat between upright/design and forward rotated/dump positions. The shortcomings associated with such motorized seats include the necessity of having to size the motor(s) for operating in both forward dump and rewind/retraction conditions, as well as the motor being adequately reinforced to withstand inertial impact/ crash situations.

SUMMARY OF THE INVENTION

The present invention is a power seat assembly with motor actuated release and rewind of a seatback sector. First and second support plates sandwich a forwardly biased seatback sector and a cam engaged with the seatback sector in an upright position. A first pin extends from said cam offset its pivotal connection and passes through a slot defined in the second support plate to define a range of pivotal motion of the cam. A toothed gear sector rotatably mounted to an exterior of the second support plates and exhibits a polygonal shaped portion as well as an end shoulder offset and inwardly recessed from exteriorly defined teeth and the polygonal shaped portion.

An electric motor includes an output gear in toothed engagement with the gear sector and for rotating the gear sector in a first direction so that the polygonal shaped portion contacts and deflects the pin and cam out of contact with the seatback, causing it to rotate to a forward dump position. A second pin extends from the seatback sector and contacts the end shoulder at the dump position, the motor rotating the gear sector in a second direction and forcibly rewinding the seatback sector, against its bias, to the upright design position coinciding with the cam re-engaging the seatback sector.

In this fashion, the motor can be employed to trigger the cam (additional to a manual release option associated with a cable separately connected to a lever slaved to the release cam) and thereby have the main spring rotate the seat back to a dump position. The motor further operates to retract (e.g. rewind or pull up) the seatback from a dump to design position (at which point the cam resets to lock the seatback upright). Retracting motion of the motor is further responsive, upon encountering an obstruction and prior to the upright design position being achieved, to disengaging and thereby allowing the biasing forces induced by the main spring to pivot the seatback back to the forward dump position.

When not in use, the motor is de-energized, and by which its rotatable output gear driving component can be manually driven to rotate the seat back (such as by a user grasping the seat back cushion and forcibly rotating the seat back relative to its lower fixed supports. In this fashion a reduced sizing of the motor can account for its not having to manually drive the seat to the dump position and/or withstand any significant degree of load path obstruction or inertial interference.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

Figure 1:
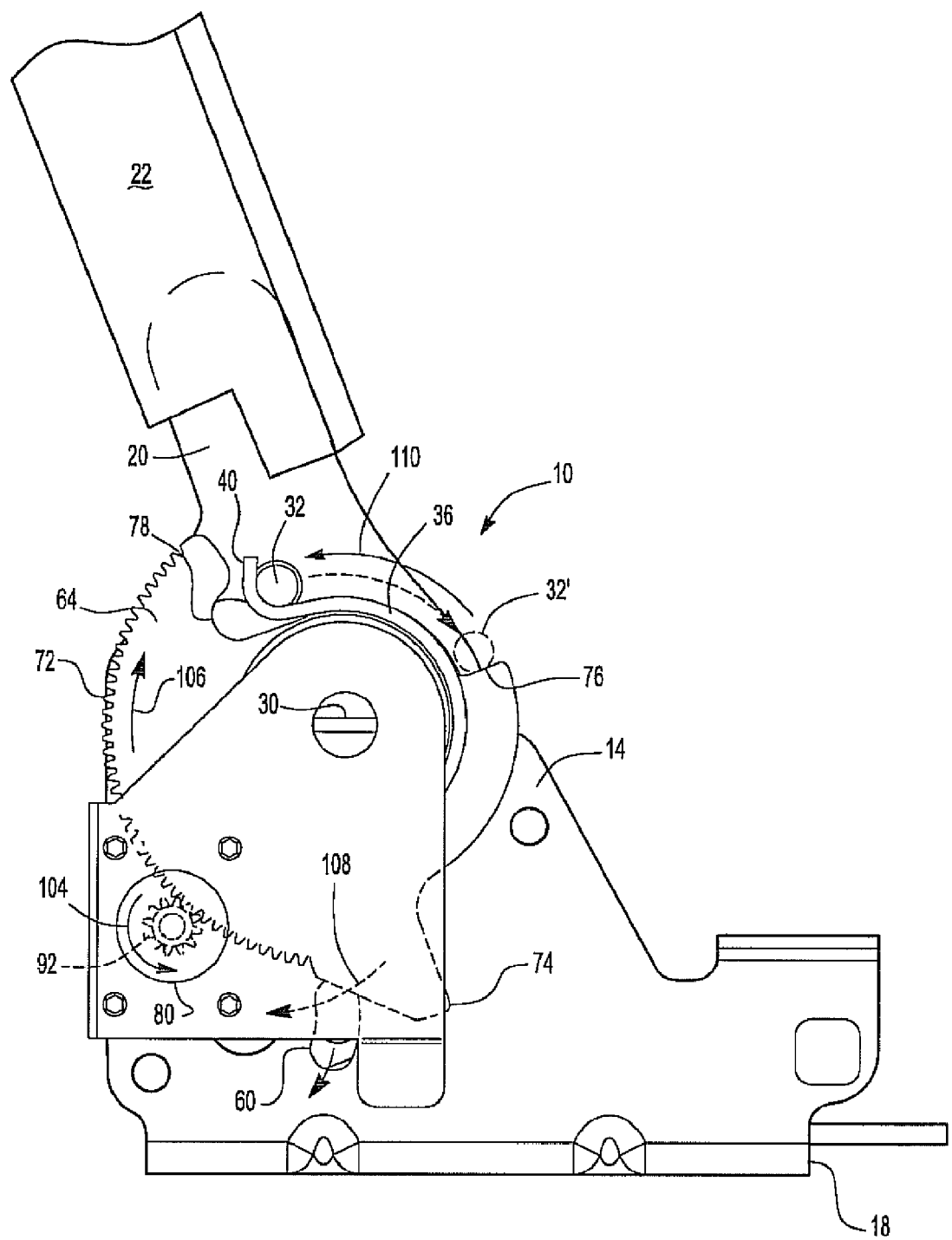
FIG. 1 shows a design position of the power dump release and rewind seat assembly and illustrating a dump direction spring biased seatback rewound by the motor to the upright engaged position.
Figure 2:
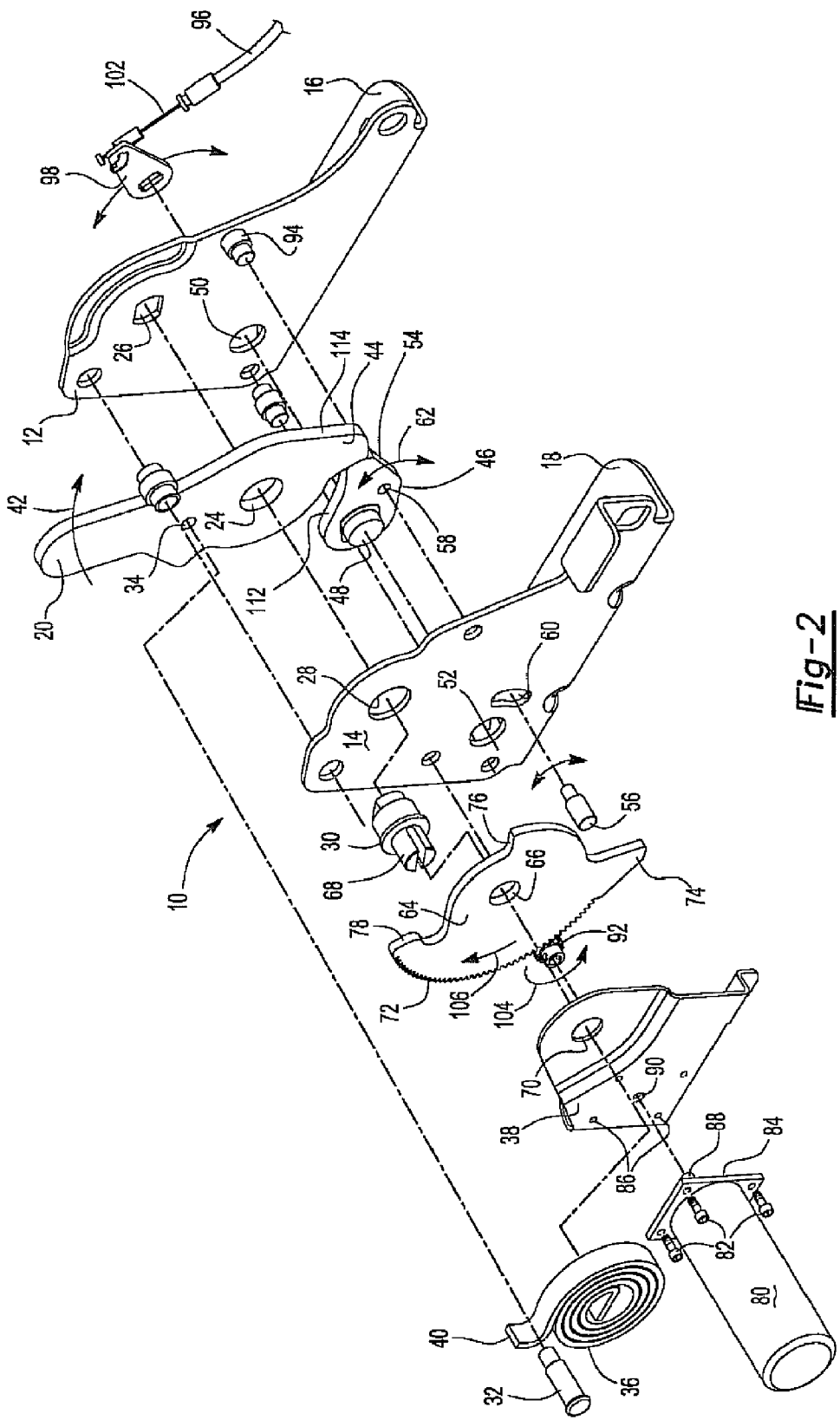
FIG. 2 is an exploded view of the components associated with the seat assembly shown in FIG. 1.

Referring collectively to FIGS. 1 and 2, both design and exploded illustrations are shown at 10 of a power dump release and rewind seat assembly. As previously described, the powered assembly 10 is capable of being incorporated into any row vehicle seat, such as having cabling, mechanical latch and main clock springs for inducing normal dump motion of the seatback relative to a seat bottom. As will be described in subsequent detail, a motor associated with the powered assembly selectively functions in a first procedure for trigger spring induced seatback dump and, in a second procedure, to rewind the seatback to the upright design position.

First 12 and second 14 fixed support plates are secured in opposing and spatially arrayed fashion such as to floor locations of a vehicle (not shown). Each of the support plates 12 and 14 are constructed of a durable grade steel (or other like suitable) material and each further define lower angled locations, see at 16 and 18 respectively, for mounting to the floor of the vehicle.

A seatback sector is shown at 20 and as further referenced in FIG. 1, fixedly secures to its upper end an upwardly extending seatback 22 associated with the seat assembly. As best shown in FIG. 2, the seatback sector 20 includes a generally intermediate located and inner annular rim 24 defining a pivotal mounting location of the seatback sector 20 between aligning mounting locations 26 and 28 associated with the support plates 12 and 14. A main pivot pin 30 is provided and secures through the mounting location 24 of the sector 20 and aligning locations 26 (keyed) and 28 (non-keyed) associated with the support plates 12 and 14.

A pin 32 secures to an aperture 34 formed in the seatback sector a distance above the main pivot location 24 from the seatback sector. A clock spring 36 is supported upon a motor support bracket 38, which in turn is secured a spatial distance from the second support plate 14. An outer curled end 40 of the spring 36 biases against the pin 32 and thereby influences the seatback sector 20 for rotation to a forward dump position as referenced by arrow 42 in relation to the seatback sector 20 in FIG. 2. The seatback sector 20 further exhibits a lowermost projection as shown at 44 (see again FIG. 2).

A cam is provided at 46 and exhibits a pivotal mounting location (see pin 48) for pivotally securing through associated apertures 50 and 52 defined through the plates 12 and 14. A forward contoured location 54 of the can 46 is configured for abuttingly engaging the seatback lower projection 44. A pin 56 extends from a location 58 of the cam 46 offset its pivotal connection and passes through a slot 60 defined in the second support plate 14 in order to define a range (see arrow 62 in FIG. 2) of pivotal motion of the cam 46.

A toothed gear sector 64 exhibits a generally circular profile and is rotatably mounted, see central aperture 66, to an exterior of the second support plate 14 and in sandwiching fashion between the second plate 14 and the motor support bracket 38. A split end portion 68 of the main pivot pin 30 seats through the aperture 66 in the gear sector 64 and supports the gear sector 64 between the second support plate 14 and a further aligning aperture 70 in the motor support bracket 38.

Other features associated with the gear sector 64 include the provision of a plurality of exteriorly facing teeth 72 along a selected arcuate distance. A generally polygonal shaped portion 74 is defined in outwardly projecting fashion from an end location of the exterior facing teeth 72. The gear sector 64 also includes an upper recessed configuration, this positioned generally opposite the gear teeth 72 and adjoining polygonal portion 74, the recessed configuration notably including an end shoulder 76 positioned in arcuately offset and inwardly recessed fashion from the plurality of exteriorly defined teeth 72 and polygonal shaped portion 74. An opposing and second end shoulder is further illustrated at 78 and, in combination with the end shoulder 76, provides necessary dimensioning to the gear sector 64 for permitting travel of the seatback secured pin 32, and as will be further described.

An electric motor is illustrated at 80 and is mounted to an exterior surface of the motor support bracket 38, such as via bolt fasteners 82 which extend through associated end mounted apertures in a base flange 84 of the motor mount, the fasteners 82 aligning and engaging through additional mounting holes formed through locations 86 in the motor support bracket 38. An output shaft 88 of the motor 80 extends through a further aperture 90 formed in the motor support bracket 38, and terminates in an output gear 92 in toothed engagement with the teeth 72 of the gear sector 64.

Figure 3:
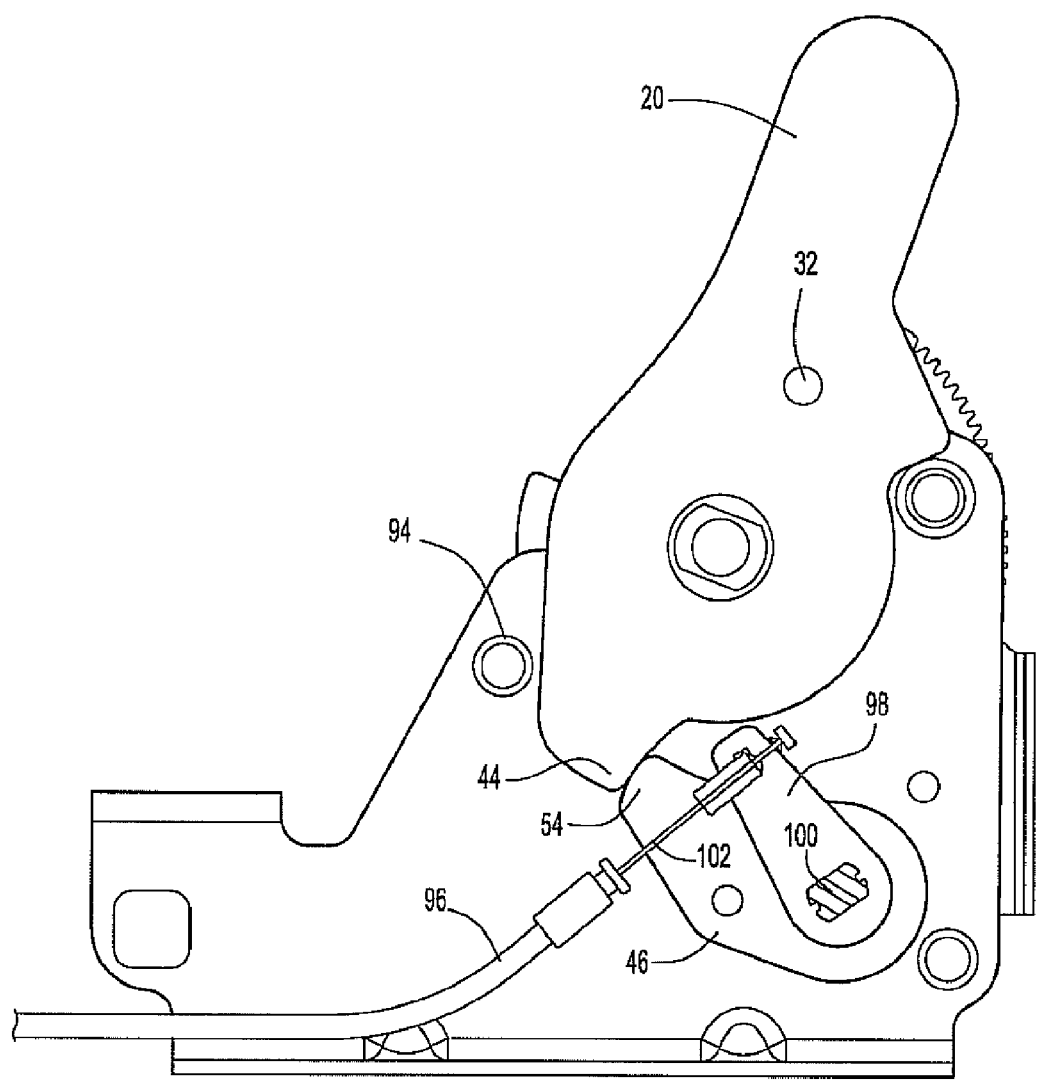
FIG. 3 is a reverse plan view of the power rewind seat assembly shown in FIG. 1, with an outer support plate removed and illustrating the cooperating engagement of the rotatable cam with slaved, and optionally manual trigger release, lever, the cam engaging the spring loaded seatback sector in the upright design position.

Other features includes a stop pin 94 secured between the support plates 12 and 14 and contacting a profiled forward surface of the seatback sector 20 (see FIG. 4) at a forward-most dump position. A cable 96 extends to a lever 98 which is secured to an exterior surface of the first support plate 12 and to which the cam 46 is slavingly rotated via a keyed pin connection 100 (as best shown in FIGS. 3 and 4) established therebetween.

Figure 4:
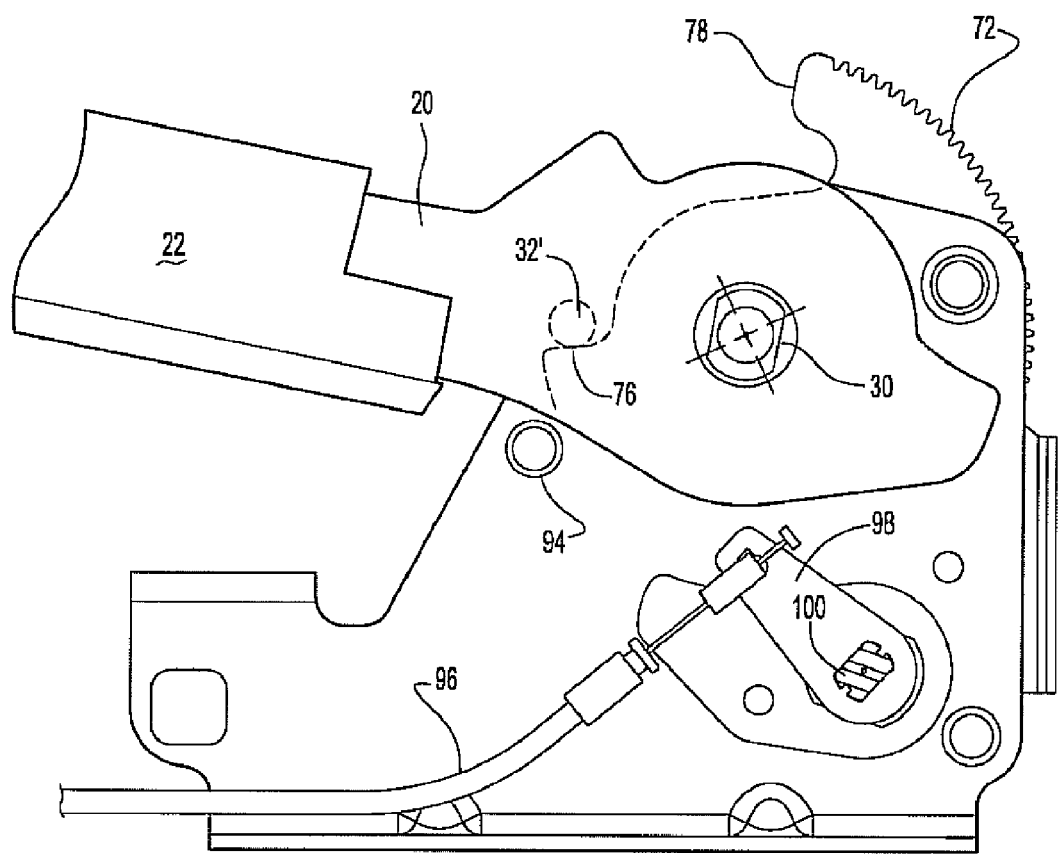
FIG. 4 is a succeeding illustration of the seat assembly as shown in FIG. 3, rotation of the gear sector causing its downward projection to displace the cam mounted and slot traveling pin, thereby disengaging the cam and permitting the biasing clock spring to rotated the seatback to the forward dump location.

Retraction of an inner portion 102 of the cable (the inner portion being secured to the lever 98 and translating within the fixed outer housing referenced at 96), enables the cam 46 to be actuated independently from the motor 80, thus pivoting the cam profile 54 out of abutting engagement with the seatback lower projection 46, thereby allowing the seatback 22 (via affixing sector 20) to forwardly rotate to the dump position of FIG. 4.

Alternatively, and when utilizing the motor 80 in order to trigger the seatback sector 20 to dump, the output gear 92 is rotated in a first direction 104 (see FIGS. 1 and 2), resulting in the gear sector 64 traveling in a rotational direction 106. The polygonal shaped projection 74 of the gear sector 64 likewise travels in direction 108 (FIG. 1) and proceeds to contact and downwardly deflect the cam operating pin 56, this in turn traveling within the pivotal range established by channel 60 (again defined in second plate 14) in order to again unseat the cam profile 54 from its abutting engagement with the seatback sector projection 44 (as also discussed in reference to the optional manual release protocol associated with the lever 98), and to thereby trigger the seatback release (see again dump position of FIG. 4). It is also noted that the dimensioning of the gear sector 64 is such that the spaced apart second and opposing recessed end shoulder 78 (and which again with the first shoulder 76 defines the opposite exterior recess channel in the gear sector) does not contact the seatback pin 32 prior to the polygonal shaped projection 74 contacting the cam guiding pin 56 and trigger the seatback release.

As is evident from viewing FIGS. 1 and 4 collectively, the forward dump position of the seatback sector 20 (and engaged seatback 22) results in the pin rotating to a forward-most position 32' (FIG. 4), at which point the pin is located proximate to a position established by the end shoulder 76. At this point, the direction of the motor is reversed (opposite that shown by arrow 104 in reference to output gear 92), and so that the gear plate 64 is reverse rotated along the direction referenced at 110 in FIG. 1, this resulting in its end shoulder 76 forcibly rotatably displacing (against the spring 36 induced bias) and thereby upwardly rewinding the seatback pin 32 and slaved seatback sector 22 to the position corresponding with FIGS. 1 and 3.

Achievement of the upright design position coincides with an upper contoured surface 112 of the cam 46 traveling along an opposing contoured surface 114 (see FIG. 2) of the seatback sector 20, during upward retraction of the seatback sector 20 (this opposite the direction of arrow 42), and concluding in the profile 54 of the cam rotating back into abutting engagement with the lower projection 44 of the seatback sector 20. Following reengagement of the cam 46 with the seatback sector 20, the motor 80 reverse rotates the gear sector 64 (in the original direction 106), to a reset position in which the polygonal portion 74 is repositioned to the location shown in FIG. 1 and the second end shoulder 78 is spaced a necessary distance from the seatback pin 32, again in order to not interfere with a subsequent seat dump triggering action initiated by rotation of the gear sector 64 along direction 106 and contacting of the polygonal projection 74 with the cam driven pin 56.

In this fashion, the motor 80 can be employed to trigger spring induced seatback dump, and which avoids the requirement that the motor 80 be sized to control the forward dumping seat function, additional to operating to retract (e.g. rewind or pull up) the seatback from the forward dump to upright design position. Retracting motion of the motor is further responsive, upon encountering an obstruction and prior to the upright design position being achieved, to disengaging and thereby allowing the biasing forces induced by the main spring 36 to pivot the seatback back to the forward dump position.

When not in use, the motor 80 is de-energized, such as by a built in disengagement switch, this removing the motor 80 from a load path established between its output gear 92 and tooth engaged gear sector 64, and such as again upon the occurrence of an obstruction contacting the seatback sector during rewinding of the gear sector 64 or an other experienced inertial (crash) load. When de-energized, the rotatable output gear 92 of die motor 80 can be manually driven to rotate the seat back 22 (such as by a user grasping an associated seat back cushion and forcibly rotating the seat back 22 relative to its lower fixed supports 12 and 14. In this fashion, reduced sizing of the motor 80 is achieved and which accounts for the motor not having to perform the manually driving the seat to the dump position (and beyond merely triggering the cam to release the spring loaded seatback) and/or withstand any significant degree of load path obstruction or inertial interference.

Having described the invention other and additional preferred embodiments will become apparent to those skilled in the art to which it pertains and without deviating from the scope of the appended claims.

We claim:

1. A power seat assembly, comprising:
    a support comprising first and second spatially arrayed support plates;
    a seatback sector pivotally secured between said support plates and biased in a forward dump direction, said seatback sector terminating in a lower-most projection;
    a cam pivotally secured to said support plates in abutting engagement with said seatback projection in an upright position, a pin extending from a location of said cam offset its pivotal connection and passing through a slot defined in said second support plate in order to establish a range of pivotal motion for said cam; and
    an electric motor operatively influencing said cam to pivot out of contact with said seatback projection, resulting in said biased seatback rotating to a forward dump position.

2. The assembly as described in claim 1, further comprising an arcuate shaped and exteriorly toothed gear sector rotatably mounting to an exterior surface of said second support plate, a polygonal shaped portion projecting from an end of said arcuate shaped gear sector and, upon said gear sector being rotated by said motor, said polygonal shaped portion contacting and downwardly deflecting said pin and cam out of contact with said seatback projection.

3. The assembly as described in claim 2, said motor further comprising an output gear in toothed engagement with said exteriorly toothed gear sector in both a first seatback release direction and a second opposite seatback rewind direction.

4. The assembly as described in claim 3, said gear sector further comprising a substantially circular configuration and exhibiting an end shoulder positioned in arcuately offset and inwardly recessed fashion from said exterior teeth and polygonal shaped portion.

5. The assembly as described in claim 4, a pin extending from said seatback sector and being influenced by a clock spring for rotating said seatback sector to said dump position, rewinding of said gear sector by said motor causing said end shoulder to engage said seatback sector and to rewind said seatback until said cam re-engages said seatback sector.

6. The assembly as described in claim 5, said electric motor further comprising a disengagement switch for removing said motor from a load path established between said output gear and tooth engaged gear sector upon occurrence of an obstruction contacting said seatback sector during rewinding of said gear sector.

7. The assembly as described in claim 5, further comprising a motor support bracket secured a spatial distance from said second support plate and upon which is also supported said clock spring, said gear sector rotatably disposed between said motor support bracket and said second support plate, an output shaft associated with said motor passing through an aperture in said motor support bracket and terminating in said output gear.

8. The assembly as described in claim 5, said motor reverse rotating said gear sector, following reengagement of said cam to said seatback sector, to a reset position coinciding with said upright position of said seatback sector.

9. The assembly as described in claim 1, further comprising a cable actuated lever secured to an exterior surface of said first plate and to which said cam is slavingly rotated, said lever actuating said cam independent from said motor to release said seatback sector.

10. The assembly as described in claim 1, further comprising a stop pin secured between said support plates and contacting said seatback sector at a forward-most dump position.

11. A power seat assembly with motor actuated release and rewind of a seatback sector, said assembly comprising:
    first and second fixed support plates between which are pivotally supported a forwardly biased seatback sector and a cam mounted in pivotal fashion between said support plates and engaged with said seatback sector in an upright position;
    a first pin extending from a location of said cam offset its pivotal connection and passing through a slot defined in said second support plate to define a range of pivotal motion of said cam;
    a toothed gear sector rotatably mounted to an exterior of said second support plate and exhibiting a polygonal shaped portion as well as an end shoulder positioned in arcuately offset and inwardly recessed fashion from a plurality of exteriorly defined teeth and said polygonal shaped portion;
    an electric motor including an output gear in toothed engagement with said gear sector and for rotating said gear sector in a first direction so that said polygonal shaped portion contacts and deflects said pin and cam out of contact with said seatback, causing said seatback to rotate to a forward dump position; and
    a second pin extending from said seatback sector and contacting said end shoulder at said dump position, said motor rotating said gear sector in a second direction and forcibly rewinding said seatback sector, against said bias, to said upright design position coinciding with said cam re-engaging said seatback sector.

12. The assembly as described in claim 11, said second pin extending from said seatback sector being influenced by a clock spring for rotating said seatback sector to said dump position.

13. The assembly as described in claim 12, further comprising a motor support bracket secured a spatial distance from said second support plate and upon which is also supported said clock spring, said gear sector rotatably disposed between said motor support bracket and said second support plate, an output shaft associated with said motor passing through an aperture in said motor support bracket and terminating in said output gear.

14. The assembly as described in claim 11, said motor reverse rotating said gear sector, following reengagement of said cam to said seatback sector, to a reset position coinciding with said upright position of said seatback sector.

15. The assembly as described in claim 11, further comprising a cable actuated lever secured to an exterior surface of said first support plate and to which said cam is slavingly rotated, said lever actuating said cam independent from said motor to release said seatback sector.

16. The assembly as described in claim 11, said electric motor further comprising a disengagement switch for removing said motor from a load path established between said output gear and tooth engaged gear sector upon occurrence of an obstruction contacting said seatback sector during rewinding of said gear sector.

17. The assembly as described in claim 11, further comprising a stop pin secured between said support plates and contacting said seatback sector at a forward-most dump position.

18. A power seat assembly, comprising:
a support;
a seatback sector pivotally secured to said support and biased in a forward dump direction, said seatback sector terminating in a lower-most projection;
a cam pivotally secured to said support in abutting engagement with said seatback projection in an upright position;
said support further comprising first and second spatially arrayed support plates between which are supported said seatback sector and cam, a pin extending from a location of said cam offset its pivotal connection and passing through a slot defined in said second support plate in order to establish a range of pivotal motion for said cam;
a cable actuated lever secured to an exterior surface of said first plate and to which said cam is slavingly rotated, said lever actuating said cam independent from said motor to release said seatback sector; and
an electric motor operatively influencing said cam to pivot out of contact with said seatback projection, resulting in said biased seatback rotating to a forward dump position.

* * * * *